Aug. 7, 1962

P. E. OLSON ETAL 3,048,675

MULTI-POSITION MANUAL CONTROL VALVE WITH
STEP-BY-STEP INSURING FEATURE

Filed Sept. 29, 1959

INVENTORS
PAUL E. OLSON
ELLIS E. HEWITT
BY
Aalbert A. Steinmeler
ATTORNEY

Aug. 7, 1962     P. E. OLSON ETAL     3,048,675
MULTI-POSITION MANUAL CONTROL VALVE WITH
STEP-BY-STEP INSURING FEATURE

INVENTORS
PAUL E. OLSON
ELLIS E. HEWITT
BY Adelbert A. Steinmiller
ATTORNEY

Aug. 7, 1962 P. E. OLSON ETAL 3,048,675
MULTI-POSITION MANUAL CONTROL VALVE WITH
STEP-BY-STEP INSURING FEATURE
Filed Sept. 29, 1959 5 Sheets-Sheet 3

INVENTORS
PAUL E. OLSON
ELLIS E. HEWITT
BY
Adelbert A. Steinmiller
ATTORNEY

INVENTORS
PAUL E. OLSON
ELLIS E. HEWITT
BY Adelbert A. Steinmiller
ATTORNEY

United States Patent Office 3,048,675
Patented Aug. 7, 1962

3,048,675
MULTI-POSITION MANUAL CONTROL VALVE WITH STEP-BY-STEP INSURING FEATURE
Paul E. Olson, Pittsburgh, and Ellis E. Hewitt, Ruffsdale, Pa., assignors to Westinghouse Air Brake Company, Wilmerding, Pa., a corporation of Pennsylvania
Filed Sept. 29, 1959, Ser. No. 843,173
17 Claims. (Cl. 200—61.86)

This invention relates to a multi-position manually operated control valve device for controlling the operation of a fluid motor and more particularly to a multi-position manually operated control valve device of the rotary valve type selectively manually operable to any one of a plurality of fixed positions.

There are presently on the market a number of well-known multi-position control valve devices of the rotary valve type having a handle for manually moving the rotary valve of the control valve device or rotary valve device to any one of several positions for effecting the supply of fluid under pressure from a suitable source of fluid pressure to a device to be controlled, such as a fluid motor, and for effecting the release of fluid under pressure from the device to be controlled to atmosphere.

In some installations where a control valve device of the multi-position manually operated rotary valve type may be used, it is very important that the rotary valve is rotated to its several different positions in a certain chosen sequence without the possibility of the rotary valve being rotated from any one of its several positions past a next adjacent position until the rotary valve has remained in the next adjacent position a chosen interval of time to insure proper sequential operation of the fluid motor or other device to be controlled. Where such sequential operation is required, it is necessary to insure that the operating handle by which the rotary valve of the control valve device is rotated to its several different positions, cannot be rotated from any one of its several corresponding positions past a corresponding adjacent position until the handle has remained in the corresponding adjacent position the chosen interval of time required to insure that when the rotary valve is rotated to the adjacent position, the desired operation of the fluid motor or other device to be controlled, has occurred.

Accordingly, it is the general purpose of this invention to provide a novel, lightweight, inexpensive and simplified control valve device of the multi-position, manually operated rotary valve type having a handle control means to insure that the handle cannot overtravel when moved from any one of its several positions to an adjacent position and must remain in the adjacent position a chosen interval of time.

Essentially the multi-position, manually operated rotary valve type control valve device of the present invention comprises a valve body having a flat rotary valve seat provided with several ports through which fluid under pressure may flow to corresponding passageways in the valve body, and a rotary valve having therein several passageways connected to corresponding ports opening onto a flat face adapted to contact the rotary valve seat whereby communications may be established from certain ports in the rotary valve seat through the passageways and ports in the rotary valve to certain other ports in the valve seat when the rotary valve is moved to its several different positions.

More specifically, the control valve device of the present invention further comprises a pivoted operating handle operatively connected to the rotary valve and having associated therewith a sectional quadrant plate provided with several spaced-apart projecting fingers which are so constructed and arranged as to insure movement of the handle in a zigzag manner in order to traverse a generally arcurate path.

The zigzag manner of movement of the handle of the control valve device of the above-mentioned type, in addition to insuring that the handle cannot overtravel when manually moved from any one of its several positions to an adjacent position, also insures that the handle cannot be moved by vibration from any one of its several positions in an arc to an adjacent position in the arc and thereby cause an undesired operation of the fluid motor or other device controlled by the control valve device.

An additional feature of the control valve device of the present invention relates to an interlock switch operated by movement of the handle of the control valve device and so related to the path of movement of the handle as to be operated to a selected position, such as the closed position, in only one position of the handle.

*Description*

Figure 1:
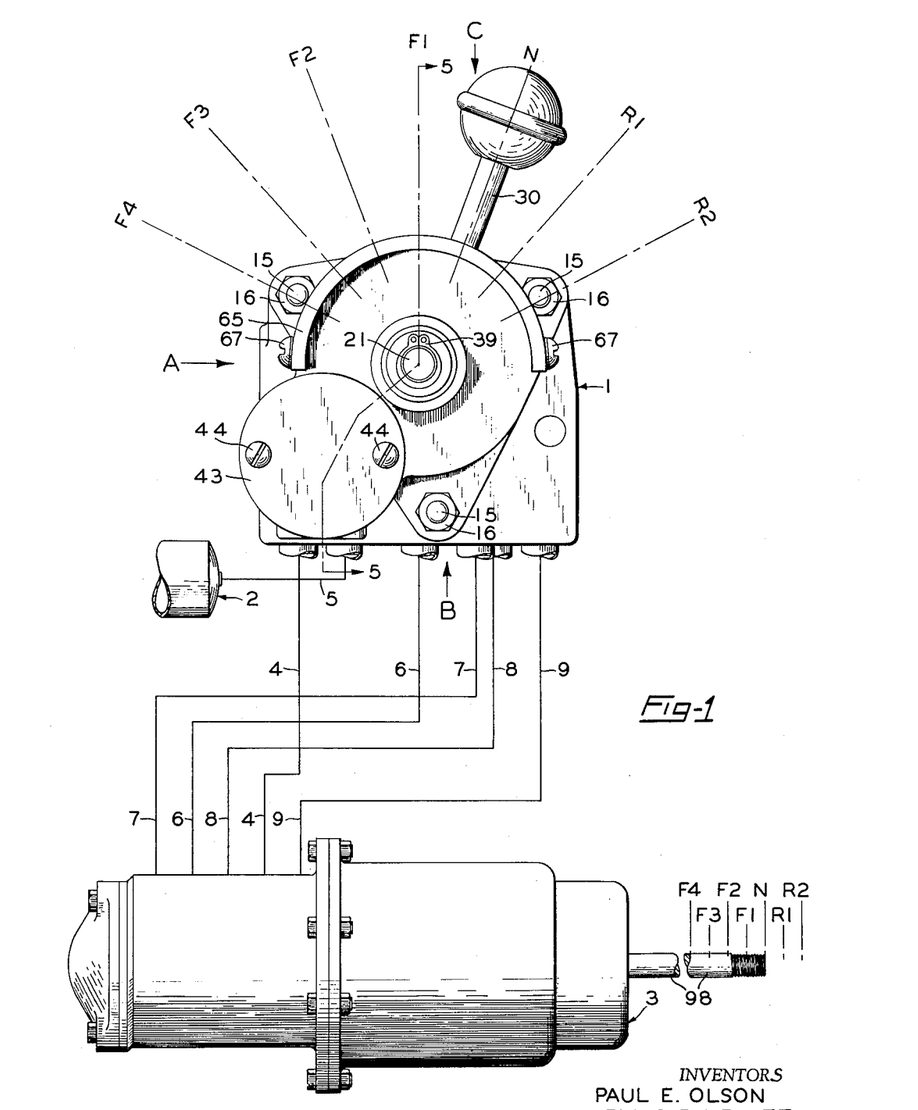
FIG. 1 is a diagrammatic plan view, in outline, of a seven-position manually operated control valve device of the rotary valve type embodying the invention, together with a seven-position fluid motor controlled thereby.
Figure 2:
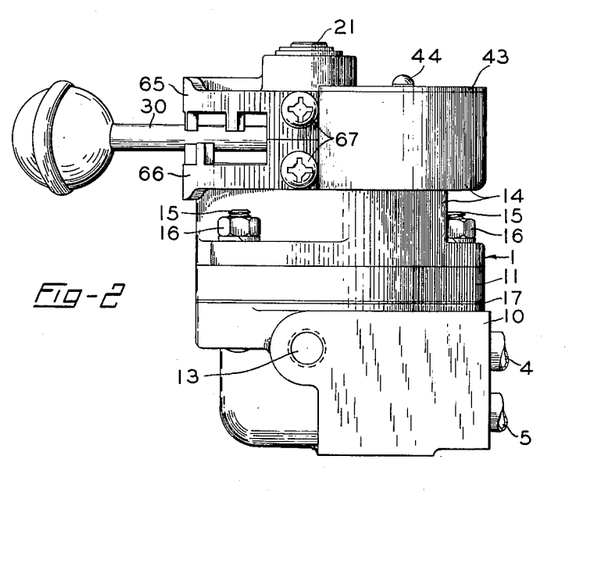
FIG. 2 is an elevational view, in outline, looking in the direction of the arrow A shown in FIG. 1, and showing certain structural details of the novel manually operative control valve device shown in FIG. 1.
Figure 3:
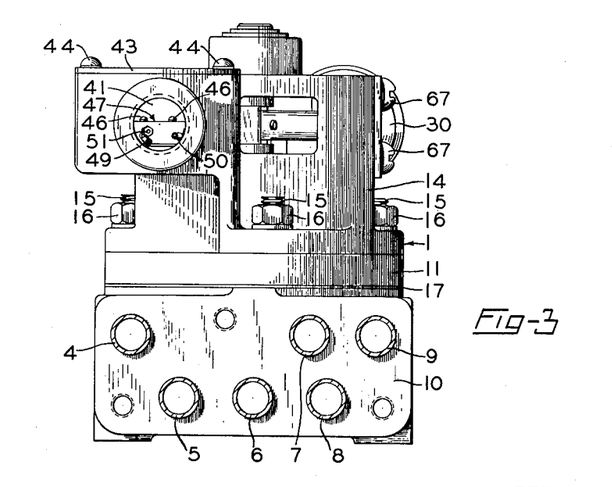
FIG. 3 is an elevational view, in outline, looking in the direction of the arrow B shown in FIG. 1, and showing the novel control valve device and the pipe bracket section thereof to one face of which all pipe connections are made.

In FIG. 1 of the drawings, there is shown a multi-position, manually operated, control valve device or rotary valve device 1 embodying the invention. The rotary valve device 1 is arranged for controlling the supply of fluid under pressure from a reservoir 2, charged with fluid under pressure by a fluid compressor (not shown), to a multi-position fluid motor 3 through six pipes 4, 5, 6, 7, 8 and 9, and the release of fluid under pressure from the fluid motor to atmosphere for controlling the operation thereof.

As shown in the drawings, the rotary valve device 1 is preferably built up in casing sections comprising a pipe bracket 10 and a body 11 to which the pipe bracket 10 is attached and which is provided with a rotary valve seat 12.

Figure 5:
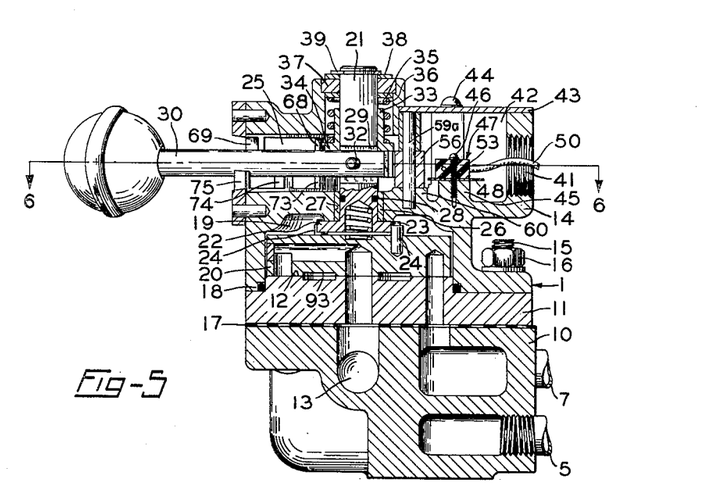
FIG. 5 is a cross-sectional view, taken along the line 5—5 of FIG. 1, looking in the direction of the arrows, and showing certain details of an operating handle of the control valve device and a rotary valve operated thereby.
Figure 7:
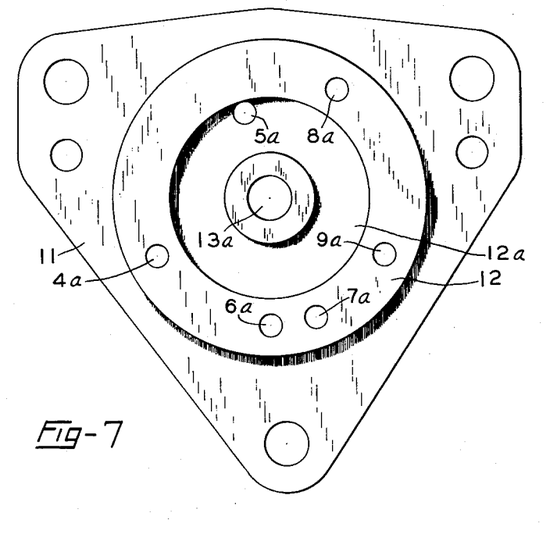
FIG. 7 is a plan view, of the rotary valve seat employed in the control valve device shown in FIG. 1.

As shown in FIG. 7 of the drawings, there are seven ports of various sizes opening at the face of the rotary valve seat 12 and these ports are connected by passageways in the body 11 to corresponding passageways in the pipe bracket 10, two of these passageways appearing in FIG. 5. Six of the passageways in the pipe bracket 10 are connected to six tapped ports opening at the face of the pipe bracket and into which are received one threaded end of the respective pipes 4, 5, 6, 7, 8 and 9, respectively. For convenience of identification, six of the ports in the rotary valve seat 12 are designated by the numerals 4a, 5a, 6a, 7a, 8a and 9a. The remaining and largest port in the face of the rotary valve seat 12 is an exhaust port and this port is connected by a passageway in the body 11 to a corresponding passageway in the pipe bracket 10 which latter passageway is open to atmosphere through a port 13 opening to the exterior of pipe bracket 10. Therefore, for convenience and to be consistent, the seventh or exhaust port in the rotary valve seat 12 is designated by the numeral 13a. The rotary valve seat 12 is further provided with a shallow annular cavity 12a which is disposed between the port 13a and the ports 4a, 5a, 6a, 7a and 9a and in concentric relation therewith.

A cover or bonnet 14 is mounted upon and secured to the body 11 and pipe bracket 10 by means of three studs 15 and nuts 16. A gasket 17 is interposed between the pipe bracket 10 and the body 11 to prevent leakage of fluid under pressure from passageways which extend from the pipe bracket 10 into the body 11, while an O-ring seal 18 is provided between the body 11 and the cover 14 for a similar purpose.

The cover 14 has therein a chamber 19 into which the rotary valve seat 12 opens and which contains a rotary valve 20 mounted to rotate on the seat 12. A rotary valve operating stem 21 is provided at one end thereof with a flat disc 22 formed integral therewith. The disc 22 has two substantially diametrically oppositely disposed slots 23, only one of which appears in FIG. 5. Carried on the upper side of the rotary valve 20, as viewed in FIG. 5, are two substantially diametrically oppositely disposed dowel pins 24 which fit in the slots 23 to provide a driving connection between the rotary valve and the operating stem 21.

The operating stem 21 extends upward from the disc 22, as viewed in FIG. 5, through a cavity 25 cast in the cover 14 to the exterior of the cover, and is suitably journaled in a bushing 26 carried by the cover 14 and disposed in a bore 27 therein connecting the chamber 19 to the cavity 25. The operating stem 21 carries an O-ring seal 28 in a peripheral annular groove therein to prevent leakage of fluid under pressure from the chamber 19 along the stem to the cavity 25.

The operating stem 21 has, intermediate its ends and on the portion thereof disposed in the cavity 25, a web portion 29 comprising two parallel flat sides formed by milling or machining away a portion of the stem. An operating handle 30, bifurcated at one end with one bifurcation 31 longer than the other for a reason hereinafter made apparent, extends from the exterior of the cover 14 through the cavity 25 in the cover, and is pivotally mounted, as by means of a pin 32, on the web portion 29 of the stem 21.

Slidably mounted on the operating stem 21 above the handle 30, as viewed in FIG. 5, is a sleeve 33 having formed on the lower end thereof a collar 34. Disposed about the sleeve 33 and between the collar 34 and a spring seat 35 is a spring 36 which acts through the collar 34 to normally bias the handle 30 to a horizontal position as shown in FIG. 5. The spring seat 35 rests against a lubricating element 37 constructed from powdered brass and fused together by sintering so as to provide a plurality of spaces for receiving oil for lubricating the operating stem 21. The lubricating element 37 is disposed between the spring seat 35 and a flat disc washer 38 disposed about the operating stem 21 and retained thereon by a snap ring 39 which is inserted in a groove formed in the stem 21, the washer 38 serving to protect the lubricating element 37 against breakage when installing and removing the snap ring 39.

Figure 6:
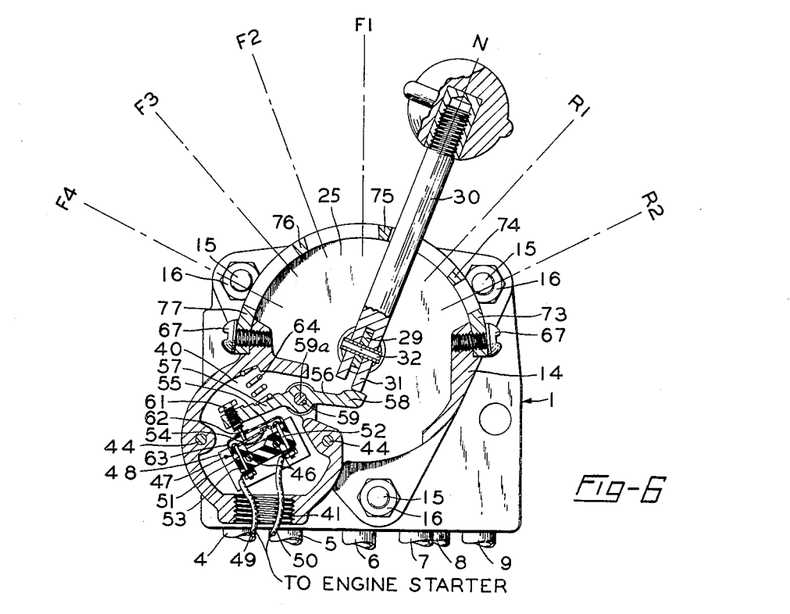
FIG. 6 is a cross-sectional view, taken along the line 6—6 of FIG. 5, looking in the direction of the arrows, and showing certain details of an interlock switch operatively controlled by the operating handle of the novel control valve device. This view is rotated 90 degrees to conform to the position of the valve device as shown in FIG. 1.

As shown in FIG. 6 of the drawings, the cavity 25 in the cover 14 opens into a second cavity 40 which is in turn open to the exterior of the cover 14 through a threaded opening 41 (FIG. 5) in the side of the cover and through an unthreaded opening 42 in the top of the cover the latter of which is provided with a removable cover plate 43 removably secured to the cover by means such as two machine screws 44. Formed integral with the cover 14 and extending into the cavity 40 therein is a first boss 45 upon which is mounted, as by means of a pair of machine screws 46, a switch device 47 there being a sheet of insulating material 48 disposed between the switch device and the boss 45, the insulating material 48 extending outward beyond the boss 45, as shown in FIG. 5 of the drawings, to prevent a short circuit between the cover 14 and either of a pair of insulated covered wires 49 and 50 connected to the switch device 47 if the insulating covering on that portion of these wires adjacent the switch device 47 becomes frayed or is removed further back from the ends of these wires than is necessary when these wires are connected to the switch device.

The switch device 47 is connected by wires 49 and 50 in a control circuit, such as a series circuit including a storage battery, an engine starting and ignition switch, and an internal combustion engine starting motor (not shown) whereby operation of the starting switch to a circuit closed position whenever the switch device 47 is closed, effects operation of the starting motor to start the internal combustion engine.

As shown in FIG. 6 of the drawings, the switch device 47 comprises two binding posts 51 and 52 to which the wires 49 and 50 are respectively connected, each binding post being imbedded in an insulation member 53 through which pass the machine screws 46 which mount the switch device 47 upon the boss 45, as hereinbefore mentioned. The switch device 47 further comprises a pair of contact members 54 and 55 connected respectively to the binding posts 51 and 52. The contact members 54 and 55 are constructed of a resilient material, such as spring steel, and are of such configuration that, when they are assembled to the binding posts 51 and 52 respectively, they are biased into contact with each other to complete a circuit between the wires 49 and 50.

For effecting movement of the contact member 54 out of contact with contact member 55, a switch operating lever or bell crank 56 is provided. The bell crank 56 has two arms 57 and 58 and is mounted as by means of a key 59 on a pin 59a, one end of which is rotatably mounted in a bore drilled in a second boss 60 (FIG. 5) formed integral with the cover 14 and extending into the cavity 40.

The arm 57 of the bell crank 56 is provided with an adjustable set screw 61 having a reduced portion 62 which extends through an opening in a cover member 63 which is secured to the insulation member 53 of the switch device 47. Disposed between arm 57 and the inside wall of the cover 14 is a spring 64 for biasing the bell crank 56 in a counterclockwise direction about the center line of the pin 59a to normally, through the intermediary of the adjusting screw 61, move the contact member 54 away from and out of contact with the contact member 55 to thereby open the circuit controlled thereby.

The arm 58 of the bell crank 56 is so disposed as to be in the path of movement of the longer bifurcation 31 of the handle 30 whereby the bifurcation 31, upon rotating the handle 30 from any other one of its seven different positions, to only a neutral position N, in which it is shown in FIG. 6 of the drawings, contacts the arm 58 and rocks the bell crank 56 clockwise about the center line of the pin 59a to the position in which it is shown in FIG. 6. As the bell crank 56 is rocked clockwise to the position in which it is shown in FIG. 6 of the drawings, the adjustable set screw 61 is moved in a direction away from the contact member 54 whereupon the inherent resiliency of the contact member 54 causes it to follow the reduced portion 62 of the set screw 61 until the end of this contact member contacts the contact member 55. Such closure of the contact member of the switch 47 will, if employed in an engine starting motor circuit, as hereinbefore mentioned, condition the engine starting motor circuit for energization upon closure of the usual starter switch.

From the above, it is apparent that the circuit to the engine starting motor is closed only when the handle 30 is moved to the one position referred to as Neutral position N.

According to the invention, two alike but oppositely disposed and arranged quadrants 65 and 66 are each secured to the outer periphery of the cover 14 by means such as a pair of machine screws 67. Each of the quadrants 65 and 66 has projecting from one side thereof five fingers, two of which are disposed at the opposite ends of the quadrant and are slightly longer than the remaining three fingers. The remaining three fingers are arranged between the two end fingers in equal arcuately spaced-apart relation. Consequently, when the quadrants 65 and 66 are secured to the cover 14 by the machine screws 67 in the manner shown in FIG. 4 of the drawings with the quadrant 65 disposed above the quadrant 66, the quadrant 65 provides five spaced-apart downward projecting fingers 68, 69, 70, 71 and 72, and the quadrant 66 provides five spaced-apart upward projecting fingers 73, 74, 75, 76 and 77. As can be clearly seen from FIG. 4, the lower ends of the end fingers 68 and 72 on the quadrant 65 abut respectively, the upper ends of the end fingers 73 and 77 on the quadrant 66. Furthermore, as can be clearly seen from FIG. 4, the downward projecting fingers 69, 70 and 71 on the upper quadrant 65 are disposed arcuately respectively, between the upward projecting fingers 74 and 75, 75 and 76, and 76 and 77 on the lower quadrant 66.

Since the two machine screws 67 for each of the quadrants 65 and 66 are located substantially 180 degrees from each other, the quadrants 65 and 66 are respectively anchored against rotation about the respective machine screws in the opposite ends of the respective quadrants by means of dowel pins 78 and 79 which are carried by the cover 14 and extend through appropriate holes in the quadrants, the hole in each quadrant being located arcuately substantially midway the length of the respective quadrant.

With the two quadrants 65 and 66 secured to the cover 14 by means of the machine screws 67 and dowel pins 78 and 79 respectively, the downward extending fingers on the quadrant 65 and the upward extending fingers on the quadrant 66 form a zigzag path for the handle 30. The length and radial spacing of the fingers on the two quadrants is so chosen and arranged that the distance between the adjacent sides of two oppositely disposed fingers is slightly in excess of the diameter of the handle 30, and the distance between the end of each projecting finger on either of the quadrants and that portion of the other quadrant between two adjacent fingers is also slightly greater than the diameter of the handle 30. Therefore, the width of the opening in the zigzag path, formed by the oppositely disposed fingers on the two quadrants, throughout its entire length is substantially the same as the diameter of the handle 30. Hence, in order to rotate the handle 30 through its operating arc past a finger, the handle 30 must be rocked either upward or downward about the pin 32, against the biasing force of spring 36, depending upon whether the respective finger is extending upward or downward, until the handle will clear the respective finger in which position the handle will be in contact with the quadrant other than the quadrant carrying the respective finger, and then rotated until the handle 30 contacts the next finger on the quadrant other than the quadrant carrying the respective finger. In order to rotate the handle 30 past the last-mentioned next finger, the handle 30 must be again rocked about the pin 32 in a direction corresponding to the direction of projection of the finger until the handle will clear this finger. The handle 30 can then be rotated until it contacts the next oppositely projecting finger.

Since the handle 30 is connected to the rotary valve 20 through the operating stem 21 and dowel pins 24 carried by the rotary valve, rotation of the handle 30 effects rotation of the rotary valve 20 on its seat 12 formed on the body 11. The rotary valve 20, which will now be described in detail, is provided with several ports, cavities and passageways which are so related to the ports 4a, 5a, 6a, 7a, 8a and 9a in the rotary valve seat 12 as to control, in certain positions of the rotary valve, the supply of fluid under pressure from the reservoir 2 through certain of these ports, cavities, and passageways to certain of the pipes 4, 5, 6, 7, 8 and 9 which are connected to the fluid motor 3 and the release of fluid under pressure from certain other of these pipes to the atmosphere to control operation of a power piston (not shown) of the fluid motor 3. The fingers on the quadrants 65 and 66 are so arranged that when the handle 30 is moved into contact with each of the fingers projecting into the zigzag path of movement of the handle formed by these fingers, the rotary valve 20 will be in one of its abovementioned certain positions in which fluid under pressure will be supplied from the reservoir 2 to certain of the pipes 4, 5, 6, 7, 8 and 9 and released from certain other of these pipes to the atmosphere.

Figure 8:
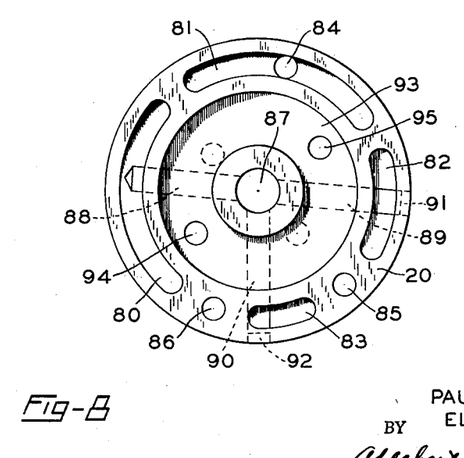
FIG. 8 is a plan view of the rotary valve employed in the control valve device shown in FIG. 1, looking in the direction of the face thereof that contacts the rotary valve seat and showing in detail the location of the ports and passageways in the rotary valve.

In order to provide for conveying fluid under pressure through the rotary valve 20, this rotary valve, as shown in detail in FIG. 8, is provided with four elongated arc-shaped circumferentially-spaced cavities 80, 81, 82 and 83 milled or machined in the face thereof that is adapted to contact the rotary valve seat 12 formed on the body 11. Midway the circumferential length of the cavity 81, a first port 84 extends from the cavity 81 through the rotary valve 20 to the opposite face thereof. A second port 85 disposed between the adjacent ends of the cavities 82 and 83 extends through the rotary valve 20 from one face thereof to the opposite face while a third port 86, disposed between the adjacent ends of the cavities 80 and 83 extends through the rotary valve between the two opposite faces thereof. The face of the rotary valve 20 containing the cavities 80, 81, 82 and 83 is further provided at the center thereof with a bottomed bore 87 of substantially the same depth as the cavities 80, 81, 82 and 83 and connected to the respective cavities 80, 82 and 83 by passageways 88, 89 and 90. The passageways 88 and 89 are formed by drilling from the periphery of the rotary valve 20 radially inward through the cavity 82, and bottomed bore 87 to the cavity 80 and then closing the outer end of this drilled passageway by means of a plug 91 pressed into the outer end thereof. The passageway 90 is likewise formed by drilling from the periphery of the rotary valve 20 radially inward through the cavity 83 to the bottomed bore 87 and then closing the outer end of this drilled passageway by means of a plug 92 pressed into the outer end thereof. The face of the rotary valve 20 containing the cavities 80, 81, 82 and 83 has milled or machined therein a shallow annular cavity 93 which is disposed between the cavities 80, 81, 82 and 83 and the bottomed bore 87 and in concentric relation therewith. The circular cavity 93 is connected to the opposite face of the rotary valve 20 by means of a pair of diametrically opposite ports 94 and 95 extending through the rotary valve. The face of the rotary valve 20 opposite the face in which are milled the cavities 80, 81, 82 and 83 is provided with two substantially diametrically opposite bottomed bores for receiving the hereinbefore mentioned dowel pins 24.

Figure 9:
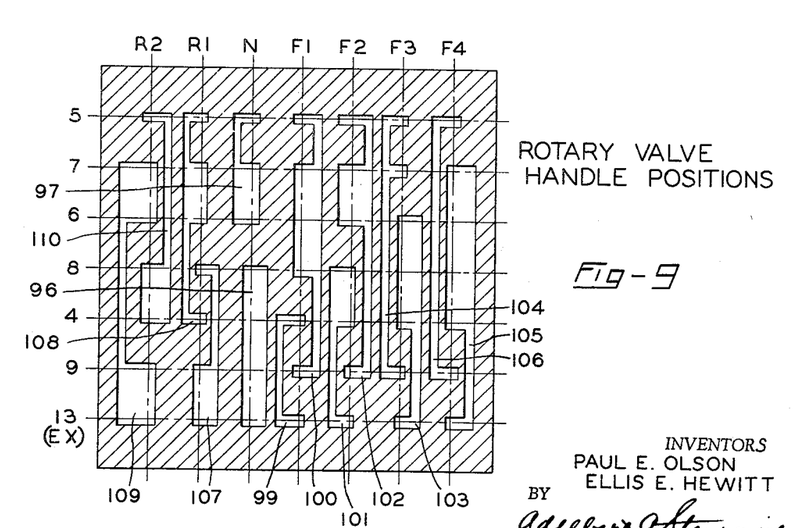
FIG. 9 is a diagrammatic view, in development form, showing the various pneumatic communications established by the rotary valve of the control valve device shown in FIG. 1, in the various positions of the operating handle thereof.

With the rotary valve 20 disposed within chamber 19 in cover 14 with the face thereof containing the cavities 80, 81, 82 and 83 in contact with the face of the rotary valve seat 12, and the rotary valve connected to the handle 30 through the intermediary of the operating stem 21, the rotary valve 20 can be rotated by rocking and turning the handle 30 from the hereinbefore mentioned Neutral position N, in which the rotary valve is shown in FIGS. 1 and 5 to six other positions, indicated in FIGS. 1, 6 and 9, by the legends F1, F2, F3, F4, R1 and R2 to control the supply of fluid under pressure from the reservoir 2 through certain of the cavities and passageways in the rotary valve 20 to certain of the pipes 4, 6, 7, 8 and 9 and corresponding chambers (not shown) in the fluid motor 3, and the release of fluid under pressure from certain other of these pipes and corresponding chambers to the atmosphere to control operation of the power piston of the fluid motor 3 whereby a device, such as the power transmission of a heavy duty truck, connected to the power piston through the intermediary of such as a piston rod may be moved from a corresponding Neutral position N to six corresponding other positions which are indicated in FIG. 1 as First Reverse position R1, Second Reverse position R2, First Forward position F1, Second Forward position F2, Third Forward position F3 and Fourth Forward position F4, respectively.

The multi-position fluid motor 3 may be the same as that disclosed and claimed in the copending United States patent application, Serial No. 815,966 of Ellis E. Hewitt, filed May 26, 1959, assigned to the assignee of this application. For a detailed description of this multi-position fluid motor, reference may be had to the above-mentioned copending patent application and therefore a detailed description is not deemed necessary here.

Briefly, however, the multi-position fluid motor 3 consists of a power piston to which is operatively connected a caged spring means for yieldingly opposing movement of the power piston in either direction from a neutral position and a novel arrangement of three piston stop means to limit the amount of movement of the power piston from its neutral position to a number of definite positions on either side of the neutral position. Selective charging or venting of the different chambers of the fluid motor in different combinations results in movement of the power piston to corresponding different power positions.

Operation

In operation, let it be assumed that the storage reservoir 2 is charged with fluid to some chosen pressure, such as one hundred pounds per square inch. Further assume that an operator of the truck desires to start the internal combustion engine of the truck and that the handle 30 and the rotary valve 20 of the control valve device 1, and the multi-position fluid motor 3 occupy their Neutral position N in which position they are shown respectively in the drawings.

Whenever the handle 30 is moved to Neutral position N, bifurcation 31 on the end of the handle is moved into contact with the end of arm 58 of switch operating lever 56 to rock this lever in a clockwise direction about the center line of the pin 59a against the force of the spring 64 to move the set screw 61 away from the contact member 54 to permit this member to move into contact with the contact member 55. With the contact member 54 in contact with the contact member 55, the circuit to the internal combustion engine starting motor may be completed by operating the starting switch to start position.

While in the position corresponding to the Neutral position N of the handle 30, the cavities 80, 82 and 83 in rotary valve 20 and the connected passageways 88, 89 and 90 respectively in the rotary valve 20 serve to connect the ports 4a, 9a and 8a in the rotary valve seat 12, and hence pipes 4, 9 and 8, to the port 13a in the seat 12 and through the passageway in the pipe bracket 10 to the exhaust port 13 opening to the exterior of the pipe bracket to completely vent fluid under pressure from the corresponding chambers in the fluid motor 3 to which the pipes 4, 8 and 9 are connected. Also, while the rotary valve 20 is in the position corresponding to the Neutral position N of handle 30, the shallow annular cavity 93 cooperates with the ports 94, 95 and 84, cavity 81 in the rotary valve 20, and the shallow annular cavity 12a in the rotary valve seat 12, to establish a passageway through which fluid under pressure is conveyed from the port 5a in the rotary valve seat 12 and hence pipe 5, which is connected to the storage reservoir 2, to the ports 6a and 7a in the rotary valve seat 12 and hence pipes 6 and 7, which are connected to corresponding chambers in the fluid motor 3.

The diagrammatic view of FIG. 9 indicates the charged and vented pipes corresponding to the Neutral position N of operating handle 30. For the sake of clarity, in FIG. 9 the cavities and passageways in the rotary valve 20 which cooperate to connect the pipes 8, 4, and 9 to the exhaust port 13 are indicated by the single numeral 96 while the cavities and ports in the rotary 20 which cooperate to connect the pipe 5 from the storage reservoir 2 to the pipes 7 and 6 are indicated by the single reference numeral 97. Also for the sake of clarity, in subsequently describing the communications established by the rotary valve 20 in its different positions, reference will be made to FIG. 9 and a single numeral used to denote the cavities and passageways which connect certain of the pipes 4, 6, 7, 8 and 9 to the exhaust port 13 and another single numeral used to denote the cavities and ports which connect certain other of these pipes to the fluid pressure supply pipe 5.

The fluid under pressure supplied to the pipes 6 and 7 and the corresponding chambers in the fluid motor 3 while the rotary valve 20 is in Neutral position N acts on the piston stop members (not shown) and piston member (not shown), as described in detail in the hereinbefore-mentioned copending application, to move the piston member to a corresponding Neutral position N if the piston member is not in Neutral position N or to maintain the piston member in this position. Also, as explained in detail in the hereinbefore-mentioned copending application, a caged spring (not shown) is effective at this time to maintain a power piston (not shown) and a piston rod 98 connected to the power piston in a corresponding Neutral position N, in which position the piston rod 98 is shown in FIG. 1. Furthermore, if the piston rod 98 is connected to operate the power transmission (not shown) of a truck, the power transmission also will be correspondingly maintained in its Neutral position.

To move the power piston and piston rod 98 of the fluid motor 3 leftward in a series of steps to successive positions corresponding, for example, to the First Forward position F1, Second Forward position F2, Third Forward position F3 and Fourth Forward position F4 of the power transmission, the operator will first rock the handle 30 upward about the pin 32 against the force of spring 36, as viewed in FIG. 5, until the handle contacts that portion of the upper quadrant 65 between the downward projecting fingers 69 and 70 (FIG. 4) on this quadrant. With the handle 30 in contact with the quadrant 65, it will be in a position to clear the upward projecting finger 75 on the lower quadrant 66 if the handle 30 is rotated in a counterclockwise direction as viewed in FIG. 1. Therefore, the operator will now turn the handle 30 in a counterclockwise direction, as viewed in FIG. 1, from Neutral position N to First Forward position F1 in which position the handle will contact the downward projecting finger 70 (FIG. 4) on the upper quadrant 65 to prevent further rotation of the handle in its raised or upward position. After the handle 30 is moved into contact with the finger 70, the operator will release the handle 30 whereupon the spring 36, acting through the collar 34 on the sleeve 30, will rock the handle 30 about the pin 32 downward to a horizontal position as shown in FIG. 5.

As the handle 30 is turned counterclockwise from its Neutral position N, the bifurcation 31 on the end of the handle is moved out of contact with the end of arm 58 of switch operating lever 56. When bifurcation 31 is moved out of contact with the arm 58, spring 64 is rendered effective to rock switch operating lever 56 counterclockwise about the center line of pin 59a to, through the intermediary of the set screw 61, move contact member 54 out of contact with the contact member 55. Movement of contact member 54 out of contact with contact member 55 opens the circuit to the internal combustion engine starting motor if not already open.

In turning the handle 30 as just described, the rotary valve 20 is rotated from the position in which it is shown in FIG. 5 to a position corresponding, for example, to the First Forward position F1 of the power transmission of the truck. The rotary value 20 is so constructed that, with the handle 30 now in its First Forward position F1, the cavities and passageways in the rotary valve connect the pipe 4 and port 4a to the exhaust port 13, as indicated by the numeral 99 in FIG. 9, while connecting the fluid pressure supply pipe 5 and port 5a to the pipes 7, 6, 8 and 9 and ports 7a, 6a, 8a and 9a, as indicated by the numeral 100 in FIG. 9, to supply fluid under pressure from the reservoir 2 to these pipes and the corresponding chambers in the fluid motor 3.

The fluid under pressure supplied to the fluid motor 3 through the pipes 7, 6, 8 and 9 operates the fluid motor 3 in the manner explained in detail in the hereinbefore-mentioned copending application to cause the piston rod 98 to shift the power transmission from its Neutral position N to its First Forward position F1.

Let it now be assumed that the operator desires to turn the handle 30 in a counterclockwise direction, as viewed in FIG. 1 from First Forward position F1 to Second Forward position F2. To do so, it will be necessary for him to first rock the handle 30 downward about the pin 32 against the force of spring 36, as viewed in FIGS. 4 and 5, until the handle contacts that portion of the lower quadrant 66 between the upward projecting fingers 75 and 76 (FIG. 4) on this quadrant. When so rocked, the handle 30 will be in a position to clear the downward projecting finger 70 on the upper quadrant 65 if the handle is turned in a counterclockwise direction as viewed in FIG. 1. Consequently, the operator will now turn the handle 30 in a counterclockwise direction, as viewed in FIG. 1, from First Forward position F1 to Second Forward position F2 in which position the handle will contact the upward projecting finger 76 (FIG. 4) on the lower quadrant 66 to prevent further rotation of the handle in its depressed position. With the handle 30 in contact with the finger 76, the operator may release the handle 30 whereupon the spring 36 will rock the handle upward to a horizontal position.

As the handle 30 is turned as just described, the rotary valve 20 is rotated therewith to a position corresponding to the Second Forward position of the piston rod 98. With the rotary valve 20 now in a position corresponding to the Second Forward position F2 of piston rod 98, the cavities and passageways in the rotary valve connect the pipes 8 and 4 and ports 8a and 4a to the exhaust port 13, as indicated by the numeral 101 in FIG. 9, while connecting the fluid pressure supply pipe 5 and port 5a to the pipes 7, 6 and 9 and ports 7a, 6a and 9a, as indicated by the numeral 102 in FIG. 9, to supply fluid under pressure from the reservoir 2 to these pipes and the corresponding chambers in the fluid motor 3.

The fluid under pressure supplied to the fluid motor 3 through the pipes 7, 6 and 9 operates the fluid motor 3, as described in the hereinbefore-mentioned copending application, to a position in which the piston rod 98 shifts correspondingly to its Second Forward position F2, thereby correspondingly operating the power transmission of the truck.

Figure 4:
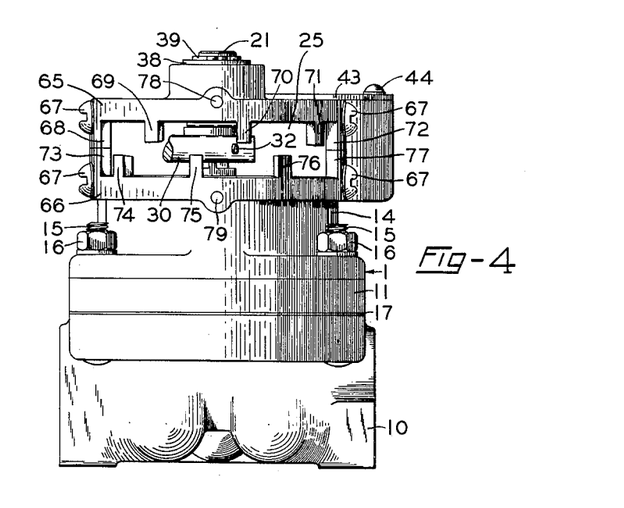
FIG. 4 is an elevational view, in outline, looking in the direction of the arrow C in FIG. 1, and showing certain structural details of the novel control valve device not apparent in FIGS. 2 and 3.

To continue the movement of the piston rod 98 of the fluid motor 3 and, if so utilized, also the power transmission connected thereto, leftward from their Second Forward position F2 to their Third Forward position F3, the operator will first rock the handle 30 upward about the pin 32 against the force of spring 36, as viewed in FIGS. 4 and 5, until the handle contacts that portion of the upper quadrant between the downward projecting fingers 70 and 71 (FIG. 4) on this quadrant. The handle 30 will now be in a position to clear the upward projecting fingers 76 on the lower quadrant 66. Accordingly, the operator will turn the handle 30 in a counterclockwise direction, as viewed in FIG. 1, from Second Forward position F2 to Third Forward position F3, in which position the handle will contact the downward projecting finger 71 (FIG. 4) on the upper quadrant 65 to prevent further rotation of the handle in its raised position. The operator may now release the handle 30 to allow it to be returned to a horizontal position by the spring 36.

As the handle 30 is turned as just described, the rotary valve 20 is rotated therewith to a corresponding position in which the cavities and passageways in the rotary valve connect the pipes 6, 8 and 4, and ports 6a, 8a and 4a, to the exhaust port 13 as indicated by the numeral 103 in FIG. 9, while connecting the fluid pressure supply pipe 5 and port 5a to the pipes 7 and 9 and ports 7a and 9a, as indicated by the numeral 104 in FIG. 9, to supply fluid under pressure from the reservoir 2 to these pipes and the corresponding chambers in the fluid motor 3.

The fluid under pressure supplied to the fluid motor 3 through the pipes 7 and 9 operates the fluid motor 3, as described in the hereinbefore-mentioned copending application, to cause the piston rod 98 to shift to its Third Forward position F3, with corresponding operation of the power transmission of the truck.

To shift the piston rod 98 and the power transmission connected thereto from their Third Forward position F3 to their Fourth Forward position F4, the operator will rock the handle 30 downward about the pin 32 against the force of spring 36, as viewed in FIGS. 4 and 5, until the handle contacts that portion of the lower quadrant 66 between the upward projecting fingers 76 and 77 and thereafter turn the handle in a counterclockwise direction, as viewed in FIG. 1, since the handle will now clear the downward projecting finger 71. The operator will turn the handle 30 in a counterclockwise direction, as viewed in FIG. 1, from Third Forward position F3 to Fourth Forward position F4 in which position the handle will contact the upward projecting end finger 77 on the lower quadrant 66. The handle 30 may now be released to allow the spring 36 to return the handle to a horizontal position.

As the handle 30 is turned as just described, the rotary valve 20 is rotated therewith to a corresponding position in which position the cavities and passageways in the rotary valve connect the pipes 7, 6, 8, and 4, and ports 7a, 6a, 8a, to the exhaust port 13 as indicated by the numeral 105 in FIG. 9, while connecting the fluid pressure supply pipe 5 and port 5a to the pipe 9 and port 9a, as indicated by the reference numeral 106 in FIG. 9, to supply fluid under pressure from the reservoir 2 to this pipe and the corresponding chamber in the fluid motor 3.

The fluid motor 3 operates in response to the fluid under pressure supplied thereto through the pipe 9, as described in the hereinbefore-mentioned copending application, to cause the piston rod 98 to shift to its Fourth Forward position F4, with corresponding operation of the power transmission of the truck if so utilized.

With the handle 30 and the rotary valve 20 in their respective positions corresponding to the Fourth Forward position F4 of the piston rod 98 and the power transmission, the operator of the truck may, by first rocking the handle 30 upward or downward accordingly as an adjacent finger on one of the quadrants projects upward or downward and subsequently turning the handle until it contacts the next adjacent finger on the other quadrant, move the handle successively back through the previous four forward positions to move the piston rod 98 in steps back to the Neutral position in which it is shown in FIG. 1 of the drawings.

Let it be assumed that the handle 30 and the rotary valve 20 of the rotary valve device 1 and the fluid motor 3 occupy their Neutral position N, in which position they are shown in FIG. 1 of the drawings. Let it be further assumed that the operator desires to move the piston rod 98 rightward in a series of steps corresponding to First Reverse position R1 and Second Reverse position R2. To do so, the operator will first rock the handle 30 downward about the pin 32 against the force of spring 36, as viewed in FIGS. 4 and 5, until the handle contacts that portion of the lower quadrant 66 between the upward projecting fingers 75 and 74 (FIG. 4) on this quadrant. With the handle in contact with the quadrant 66, it will be in a position to clear the downward projecting finger 69 on the upper quadrant 65. That being the case, the operator will now turn the handle 30 in a clockwise direction, as viewed in FIG. 1 from Neutral position N to First Reverse position R1.

As the handle 30 is turned from Neutral position N to First Reverse position R1, the bifurcation 31 on the end of the handle will operate the switch device 47 in the manner hereinbefore described in connection with turning the handle from Neutral position N to First Forward position F1.

When the handle 30 has been turned from Neutral position N to First Reverse position R1, it will contact the upward projecting finger 74 (FIG. 4) on the lower quadrant 66 to prevent further rotation of the handle in its depressed position. The operator may now release the handle 30 to permit it to be returned to a horizontal position.

In turning the handle 30 from Neutral position N, in which position it is shown in FIGS. 1, 4 and 5, to its First Reverse position R1, the rotary valve 20 is rotated from the position in which it is shown in FIG. 5 to a position corresponding to the First Reverse position R1 of handle 30. With the rotary valve 20 now in its First Reverse position R1, the cavities and passageways therein connect the pipes 8 and 9 and ports 8a and 9a to the exhaust port 13, as indicated by the numeral 107 in FIG. 9, while connecting the fluid pressure supply pipe 5 and port 5a to the pipes 7, 6 and 4 and ports 7a, 6a and 4a, as indicated by the numeral 108 in FIG. 9, to supply fluid under pressure from the reservoir 2 to these pipes and the corresponding chambers in the fluid motor 3.

The fluid under pressure supplied to the fluid motor 3 through the pipes 7, 6 and 4 operates the fluid motor 3, as described in the hereinbefore-mentioned copending application, to cause the piston rod 98 to shift from its Neutral position N to its First Reverse position R1.

To shift the piston rod 98 from its First Reverse position R1, to its Second Reverse position R2, the operator will first rock the handle 30 upward about the pin 32 against the force of spring 36, as viewed in FIG. 5, until the handle contacts that portion of the upper quadrant 65 between the downward projecting fingers 68 and 69 (FIG. 4) on this quadrant. The handle 30 is now in a position to clear the upward projecting finger 74 on the lower quadrant 66. Such being the case, the operator will now turn the handle 30 in a clockwise direction, as viewed in FIG. 1, until the handle contacts the end finger 68 (FIG. 4) on the upper quadrant 65 after which the handle may be released to permit its return to a horizontal position. In so turning the handle 30, the rotary valve is rotated to its Second Reverse position R2.

With the rotary valve 20 now in a position corresponding to the Second Reverse position R2 of the handle 30, the cavities and passageways therein connect the pipes 7, 6 and 9 and ports 7a, 6a and 9a, to the exhaust port 13, as indicated by the numeral 109 in FIG. 9, while connecting the fluid pressure supply pipe 5 and port 5a to the pipes 8 and 4 and ports 8a and 4a, as indicated by the reference numeral 110 in FIG. 9, to supply fluid under pressure from the reservoir 2 to these pipes and the corresponding chambers in the fluid motor 3.

The fluid motor 3 operates in response to the fluid under pressure supplied thereto through the pipes 8 and 4, as described in the hereinbefore-mentioned copending application, to cause the piston rod 98 to shift to its Second Reverse position R2.

With the handle 30 in the Second Reverse position R2, the operator may, by first rocking the handle in the appropriate direction in accordance with the direction of the adjacent projecting finger on the quadrants, and thereafter turning the handle until it contacts the next adjacent finger on one of the quadrants, move the handle successively back through the two reverse positions to move the piston rod 98 in steps back to the Neutral position N in which it is shown in FIG. 1 of the drawings.

It may be noted that with the handle 30 horizontal and in any of its seven positions, turning of the handle is prevented by a finger on one of the quadrants 65 and 66 until the handle is rocked upward or downward out of a horizontal position to a position in which it will clear the finger on the one quadrant after which it may be turned until it contacts a finger on the other quadrant at which time the handle must again be rocked in an opposite direction before the handle can be moved past the last-mentioned finger. Consequently the fingers on the two quadrants provide a zigzag path through which the handle 30 may be moved sequentially in steps in response to the combined upward and downward rocking and subsequent turning of the handle in a generally arcuate path. Since the handle 30 must always be rocked upward or downward prior to being turned, the interval of time required for so rocking the handle provides a chosen interval of time required to insure that, when the rotary valve is rotated from one position to an adjacent position, the desired sequential operation of the fluid motor 3 has occurred.

Having now described the invention, what we claim as new and desire to secure by Letters Patent is:

1. A multi-position manually operated control valve device, comprising, in combination, casing means having a rotary valve seat, a rotary valve means rotatably shiftable on said seat, a handle movable selectively to any one of a plurality of arcuately spaced operating positions in substantially the same plane, means providing a driving connection between said rotary valve means and said handle whereby movement of said handle from one to another of its operating positions causes rotary movement of said rotary valve means to corresponding different rotary positions, and guide means having two oppositely arranged and equally spaced-apart sets of fingers which provide a chosen path in which said handle moves, said guide means causing said handle to momentarily stop between successive steps each of which corresponds to the angular distance between successive oppositely disposed fingers and likewise to the angular distance between operating positions of said rotary valve means.

2. A multi-position manually operated control valve device, comprising, in combination, casing means having a rotary valve seat, a rotary valve means rotatably shiftable on said seat to any one of a plurality of angularly spaced positions, an operating handle for said rotary valve means, means including a driving connection between said operating handle and said rotary valve meas to cause rotary movement of said rotary valve means on said seat responsive to movement of said handle through a generally arcuate path, and guide means having two oppositely arranged and equally spaced-apart sets of fingers which provide a zigzag path through which said handle moves, said fingers of said guide means preventing continued movement of said handle in said arcuate path except in successive staggered steps, each step corresponding in distance to that corresponding to the angular spacing of said fingers and of the operating positions of said rotary valve means.

3. A multi-position manually operated control valve device, comprising, in combination, casing means having a rotary valve seat, a rotary valve element rotatably shiftable on said seat to any one of a plurality of angularly spaced operating positions, a rotatable shaft for rotating said rotary valve element on said rotary valve seat, an operating handle pivotally mounted on said shaft for rotating said shaft, and guide means providing a generally arcuate zigzag path through which said handle may be moved only in response to successive rockings of said handle about said pivot means in opposite directions and subsequent arcuate movement of said handle through a distance corresponding to the angular spacing between one of said positions of said rotary valve element and an adjacent position.

4. A multi-position manually operated control valve device as claimed in claim 3, further characterized in that said guide means comprises a pair of identical arcuate guide elements oppositely arranged in cooperative relation, each guide element being provided with several angularly spaced-apart fingers which cooperate to provide the said zigzag path through which said handle may be moved.

5. A multi-position manually operated control valve device as claimed in claim 3, further characterized in that said guide means comprises a pair of identical arcuate guide elements oppositely arranged in cooperative relation, each guide element being provided with a plurality of angularly spaced-apart fingers for insuring rocking of said handle pivotally on said shaft in one direction or the the opposite direction prior to movement of said handle resulting in rotation of said shaft.

6. A multi-position manually operated control valve device as claimed in claim 3, further characterized in that said guide means comprises a pair of identical arcuate guide elements oppositely arranged in cooperative relation, each guide element being provided with a plurality of angularly spaced apart fingers for insuring sequential rocking of said handle pivotally on said shaft first in one direction prior to movement of said handle through said generally arcuate path from one of said operating positions to an adjacent one of said positions and then in the opposite direction prior to movement of said handle from said adjacent one of said positions to a succeeding adjacent one of said positions.

7. A multi-position manually operated control valve device as claimed in claim 3, further characterized by biasing means for exerting a biasing force yieldingly opposing pivotal movement of said handle on said shaft out of a neutral position in which said handle is substantially at a right angle to said shaft.

8. A multi-position manually operated control valve device, comprising, in combination, casing means having a rotary valve seat, a rotary valve operative rotatably thereon to any one of a plurality of angularly spaced-apart positions for selectively establishing fluid pressure communications in each of said positions, a rotatable shaft mounted in said casing means for operating said rotary valve, an operating handle pivotally mounted on said shaft so that it may be swung manually from a normal position in one direction or in an opposite direction, and movable to positions corresponding to said plurality of angularly spaced positions of said rotary valve to effect rotation of said shaft and correspondingly said rotary valve to different ones of said angularly spaced positions, biasing means effective to restore said handle to its said normal position upon the release of manual pressure applied to swing said handle out of said normal position, and guide means cooperative with said handle and effective to insure rotation of said handle to said corresponding positions in steps one at a time accordingly as said handle is first swung in said one direction through a chosen angle from said normal position prior to rotation to one of said corresponding positions and then in said opposite direction back to said normal position and then in said opposite direction through an angle equal to said chosen angle prior to rotation of said handle from said one corresponding position to an adjacent position.

9. A multi-position manually operated control valve device, comprising, in combination, casing means having a rotary valve seat, a rotary valve operative rotatably on said seat to any one of a plurality of angular spaced-apart positions for selectively establishing fluid pressure communications in each of said positions, a rotatable shaft mounted in said casing means for operating said rotary valve, an operating handle pivotally mounted on said shaft, means yieldingly biasing said handle to a normal position in which said handle is at a right angle to said shaft and manually movable out of said normal position in one direction or in an opposite direction against the yielding resistance of said basng means and without movement of said shaft, said handle also being rotatable to effect rotation of said shaft and rotary valve out of one of said plurality of angular spaced-apart positions to an adjacent one of said positions, guide means cooperative with said operating handle and effective to prevent rotation of said handle out of one of said positions to an adjacent position unless said handle is first pivotally moved out of said normal position through a chosen angle.

10. A multi-position manually operated control valve device as claimed in claim 9, further characterized in that said guide means comprises a pair of identical arcuate guide elements oppositely arranged in cooperative relation, each guide element being provided with a plurality of arcuately spaced-apart fingers, the fingers on one guide element projecting laterally from one side of the guide element in one direction and the fingers on the other guide element projecting laterally from one side of the guide element in the opposite direction, the spacing and length of said fingers being such that when in oppositely assembled relation the fingers of the guide elements occupy staggered positions with the spacing between planes through the ends of the fingers on opposite guide elements such that the handle cannot pass in an arcuate path therepast without first being pivotally shifted in one direction or the opposite direction with respect to the said neutral position on said shaft.

11. A multi-position manually operated control valve device as claimed in claim 1, further characterized by switch means having a first operative position and a second operative position, and means operated by said handle and cooperating with said switch means to effect operation of said switch means to its said first operative position upon movement of said handle to one of its said operating positions and to the said second operative position of said switch means upon movement of said handle out of said one operating position to another one of its said operating positions.

12. A multi-position manually operated control valve device, comprising, in combination, casing means having a rotary valve seat, a rotary valve means rotatably shiftable on said seat, a rotatable shaft having a driving connection with said rotary valve, an operating handle pivotally mounted on said shaft and movable to any one of a plurality of operating positions whereby movement of said handle from one to another of its operating positions causes corresponding rotary movement of said rotary valve means to corresponding different rotary positions, switch means having a first operative position and a second operative position, means operated by said handle and cooperating with said switch means so as to cause said switch means to be moved to its said first operative position upon movement of said handle to a certain one of said operating positions and to said second operative position upon movement of said handle out of said certain one operating position to another one of said operating positions, and guide means cooperative with said handle for defining the different operating positions of said handle, said guide means comprising a pair of identical arcuate elements oppositely arranged in cooperative relation, each element having a plurality of arcuately spaced-apart fingers, each finger corresponding to one of said plurality of operating positions, the arrangement of said fingers being such that said handle is rockable about its pivotal connection with said rotatable shaft only while said handle is in contact with a finger, said fingers thereby insuring that said handle is momentarily stopped in each of said operating positions prior to movement of said handle to an adjacent position.

13. A multi-position manually operated control valve device, comprising, in combination, a casing means having therein a chamber and a rotary valve seat, switch means mounted in said chamber, said switch means having a first operative position and a second operative position, a rotary valve means rotatably shiftable on said seat, a pair of spaced-apart parallel rotatable shafts rotatably mounted in said casing means, one having a driving connection with said rotary valve means, an operating handle pivotally mounted at one end of said one rotatable shaft, biasing means for exerting a force yieldingly opposing pivotal movement of said handle on said shaft out of a neutral position in which said handle is substantially at a right angle to said shaft, said handle also being movable to rotate said one shaft and rotary valve means to any one of a plurality of operating positions, interlock means rigidly mounted on the other of said shafts and cooperable with said handle upon movement of said handle to a position corresponding to a certain one of said operating positions of said rotary valve means to effect operation of said switch means to its said first operative position, and upon movement of said handle from a position corresponding to the said certain one operating position of the valve means to another position corresponding to another one of the operating positions of the valve means to effect operation of said switch means to its said second operative position, and guide means cooperative with said handle for defining operating positions of said handle corresponding to the operating positions of the rotary valve means, said guide means comprising a pair of identical arcuate elements oppositely arranged in cooperative relation, each having a plurality of angularly spaced-apart fingers, each finger corresponding to one of said plurality of operating positions, said fingers cooperating to form a series of consecutive interconnected slots each at an angle to an adjacent slot, said slots constituting a zigzag path for said handle in which said handle can be moved sequentially to said different operating positions accordingly as said handle is successively swung from its normal position in one direction or in an opposite direction.

14. A multi-position manually operated control valve device, comprising in combination, a casing means having therein a chamber and a rotary valve seat, switch means mounted in said chamber, said switch means having a first operative position and a second operative position, a rotary valve means rotatably shiftable on said seat, a pair of spaced-apart parallel rotatable shafts rotatably mounted in said casing means, one having a driving connection with said rotary valve, a spring biased lever rigidly mounted on the other of said rotatable shafts for controlling the operation of said switch means, said lever being rockable to a first position in which said switch means is moved to said first operative position and to a second position in which said switch means is moved to said second operative position, an operating handle pivotally mounted at one end on said one rotatable shaft so as to be adapted to be manually swung from a normal position in one direction or in an opposite direction and rotatable to any one of a plurality of positions, said handle being so arranged with respect to said lever that, upon movement of said handle to a certain one of said operating positions, said one end of said handle is moved into the arcuate path of said lever to thereby contact one end of said lever and rock said lever from its said first position to its said second position, and, upon movement of said handle from said certain one operating position to another operating position, said one end of said handle is moved out of said arcuate path to allow said spring biased lever to be moved from its said second position to its said first position, biasing means for exerting a force yieldingly opposing pivotal movement of said handle on said one rotatable shaft out of a neutral position in which said handle is substantially at a right angle to said shaft, and guide means cooperative with said handle for defining the different operating positions of said handle, said guide means comprising a pair of identical arcuate elements oppositely arranged in cooperative relation, each having a plurality of angularly spaced-apart fingers, each finger corresponding to one of said plurality of operating positions and all of said fingers cooperating to form a series of consecutive interconnected slots each at a right angle to an adjacent slot whereby said slots constitute a zigzag path in which said handle can be moved sequentially to said different operating positions only by successively swinging said handle while in one of said slots from its said normal position in said one direction or in said opposite direction to a position in one of said slots in which it will clear one of said fingers, and while swung out of said normal position rotating said handle through another one of said slots to one of said operating positions in which said handle is in contact with one of said fingers.

15. Apparatus for providing a plurality of fixed operating positions for an operating handle of a control valve device, said handle being mounted for universal movement and being of circular cross section, said apparatus comprising a pair of identical arcuate guide elements oppositely arranged in cooperative relation, each guide element having a plurality of spaced-apart parallel-extending fingers so disposed and of such length that the gap between the sides of one finger on one guide element and the adjacent side of an adjacent finger on the other guide element is slightly wider than the diameter of said handle and the gap between parallel planes extending through the respective ends of said one and said adjacent fingers is substantially less than the diameter of said handle, said guide elements forming a zigzag path in which said handle must be moved only by successively rocking said handle laterally out of the plane of a normal position midway between the planes through the ends of said fingers and then subsequently rotating said handle through an arcuate path in a direction past the end of said one finger or past the end of said adjacent finger, depending on the direction of lateral movement of the handle, and into contact with the next adjacent finger on said one or said other guide element.

16. Apparatus as claimed in claim 15, further characterized in that the length of the fingers on each of said guide elements is such as to form between the end of one finger on each guide element and a straight portion between the two adjacent fingers on the other guide element a gap slightly greater in height than the diameter of said handle.

17. Apparatus for providing a plurality of fixed operating positions for an operating handle of a control valve device, said handle being mounted for universal movement and being of circular cross section, said apparatus comprising an arcuate guide element having a slot therein provided with a plurality of uniformly staggered fingers of equal length less than the width of said slot and extending from the opposite sides of said slot such that the gaps between the sides of one finger on one side of the slot and the adjacent side of an adjacent finger on the other side of the slot is slightly wider than the diameter of said handle and the gap between parallel planes extending through the respective ends of said one and said adjacent fingers is substantially less than the diameter of said handle, said fingers forming a zigzag path in which said handle must be moved only by successively rocking said handle laterally out of the plane of a normal position midway between the planes through the ends of said fingers and then subsequently rotating said handle through an arcuate path in a direction past the end of said one finger or past the end of said adjacent finger depending on the direction of lateral movement of said handle and into contact with the next adjacent finger on said one side or on said other side of said slot in said guide element.

References Cited in the file of this patent

UNITED STATES PATENTS

| | | |
|---|---|---|
| 1,777,303 | Goldsmith | Oct. 7, 1930 |
| 2,331,109 | De Ganahl | Oct. 5, 1943 |
| 2,370,213 | Van Horn | Feb. 27, 1945 |
| 2,419,908 | Mott | Apr. 29, 1947 |
| 2,655,167 | Dunkelow | Oct. 13, 1953 |
| 2,818,476 | Mueller et al. | Dec. 31, 1957 |
| 2,900,836 | Gleeson et al. | Aug. 25, 1959 |

FOREIGN PATENTS

| | | |
|---|---|---|
| 40,510 | Norway | Dec. 8, 1924 |
| 207,922 | Great Britain | Dec. 13, 1923 |